United States Patent
Bintz et al.

(10) Patent No.: US 10,866,154 B2
(45) Date of Patent: Dec. 15, 2020

(54) TRUNNION BOLT MONITORING SYSTEM

(71) Applicant: Arvos Ljungstrom LLC, Wellsville, NY (US)

(72) Inventors: David W. Bintz, Dallas, TX (US); Travis N. Tozer, Lawrence, KS (US)

(73) Assignee: ARVOS LJUNGSTROM LLC, Wellsville, NY (US)

( * ) Notice: Subject to any disclaimer, the term of this patent is extended or adjusted under 35 U.S.C. 154(b) by 0 days.

(21) Appl. No.: 16/464,980

(22) PCT Filed: Nov. 30, 2016

(86) PCT No.: PCT/US2016/064154
§ 371 (c)(1),
(2) Date: May 29, 2019

(87) PCT Pub. No.: WO2018/101927
PCT Pub. Date: Jun. 7, 2018

(65) Prior Publication Data
US 2019/0323910 A1    Oct. 24, 2019

(51) Int. Cl.
*G01L 5/24* (2006.01)
*F16B 31/02* (2006.01)

(52) U.S. Cl.
CPC ............. *G01L 5/24* (2013.01); *F16B 31/025* (2013.01)

(58) Field of Classification Search
CPC .. G01L 5/24; G01M 3/26; F16B 31/02; F16B 31/025; F16B 39/20
See application file for complete search history.

(56) References Cited

U.S. PATENT DOCUMENTS

| | | | | |
|---|---|---|---|---|
| 1,323,030 A | * | 11/1919 | Dodds | G01M 3/26 73/40 |
| 3,638,479 A | * | 2/1972 | Boutet | G01L 5/24 73/761 |
| 3,820,381 A | | 6/1974 | Thurston | |
| 4,372,371 A | | 2/1983 | Baker | |
| 2004/0216514 A1 | * | 11/2004 | Nunnally | F17D 5/06 73/40 |
| 2009/0206705 A1 | * | 8/2009 | Nies | B23K 20/12 310/361 |
| 2012/0079880 A1 | * | 4/2012 | Freitag | F25B 45/00 73/198 |

(Continued)

FOREIGN PATENT DOCUMENTS

| | | |
|---|---|---|
| GB | 2362198 A | 11/2001 |
| WO | 2014005735 A1 | 1/2014 |

OTHER PUBLICATIONS

International Search Report issued in corresponding PCT Application No. PCT/US2016/064154, dated Jul. 28, 2017, pp. 1-10.

(Continued)

*Primary Examiner* — Natalie Huls
(74) *Attorney, Agent, or Firm* — Murtha Cullina LLP

(57) ABSTRACT

A trunnion bolt monitoring system for an air preheater trunnion has a plurality of trunnion bolts through which extends a respective blind bore each in gas tight connection at its open end to a pressurized manifold comprising piping and T-fittings. Depressurisation of the manifold indicative of fatigue cracking of any one bolt is detected by electrical monitoring of three pressure sensors.

7 Claims, 4 Drawing Sheets

(56) References Cited

U.S. PATENT DOCUMENTS

| | | | | |
|---|---|---|---|---|
| 2016/0025608 A1* | 1/2016 | Darlington | .......... | E21D 21/0093 |
| | | | | 73/12.06 |
| 2016/0069838 A1* | 3/2016 | Bueno | ................. | G01N 29/043 |
| 2016/0370268 A1* | 12/2016 | Kondo | ................ | H01H 35/006 |
| 2018/0113097 A1* | 4/2018 | Bueno | ................. | G01N 29/043 |
| 2018/0313707 A1* | 11/2018 | Schumacher | ......... | G01L 5/0019 |
| 2019/0085826 A1* | 3/2019 | Fuglsang-Petersen | ...................... | |
| | | | | F03D 17/00 |
| 2019/0271349 A1* | 9/2019 | Madru | ................. | F16B 31/025 |

OTHER PUBLICATIONS

International Preliminary Report on Patentability issued in corresponding PCT Application No. PCT/US2016/064154 dated Jan. 7, 2019, pp. 1-15.

* cited by examiner

TRUNNION BOLT MONITORING SYSTEM

CROSS REFERENCE TO RELATED APPLICATION

This application is a national stage application of and claims priority to PCT Application No. PCT/US2016/064154, filed Nov. 30, 2016, the subject matter of the aforementioned application is hereby incorporated by reference in its entirety.

FIELD OF THE INVENTION

This invention relates to the monitoring of trunnion bolts for rotary regenerative air preheaters and more particularly relates to a trunnion bolt monitoring system which, in use, monitors for cracking and/or shearing of any one bolt.

BACKGROUND OF THE INVENTION

Rotary regenerative air preheaters are typically used to transfer heat from a flue gas stream exiting a furnace, to an incoming combustion air stream to improve the efficiency of the furnace. Conventional preheaters include a heat transfer sheet assembly that includes a plurality of heat transfer sheets stacked upon one another in a basket. The heat transfer sheets absorb heat from the flue gas stream and transfer this heat to the combustion air stream. The preheater further includes a rotor having radial partitions or diaphragms defining compartments which house a respective heat transfer sheet assembly. The preheater includes sector plates that extend across upper and lower faces of the preheater to divide the preheater into one or more gas and air sectors. The hot flue gas stream and combustion air stream are simultaneously directed through respective sectors. The rotor, which is rotatably mounted on a trunnion bearing post, in operation rotates the flue gas and combustion air sectors in and out of the flue gas stream and combustion air stream to heat and then to cool the heat transfer sheets thereby heating the combustion air stream and cooling the flue gas stream.

The preheater may be considered a piece of heavy machinery and a typical example has a rotor assembly 2.40 metres (93" or 7.75 feet) high and 14.25 metres (561" or 46.75 feet) in diameter which is fabricated from steel with a rotating mass weighing some 500-575 metric tons (1,000,000 Lbs to 1,150,000 Lbs) and in service is rotating constantly at about 1.00 revolutions per minute. In operation, the trunnion bearing post will experience constantly changing eccentric loads which are transferred from an integral mounting flange to the preheater body via a ring of trunnion bolts. The cumulative effect of the constantly varying tensile forces on any one bolt can be cracking and ultimately failure through shearing. Once one bolt fails the remaining ones must take up the load. It will be appreciated that the remaining bolts will then be subject to even greater individual loading, leading more rapidly toward failure. In a worst case scenario multiple failures would so weaken the flange mounting that cascading failures would occur.

This is sometimes avoided when, during maintenance intervals, the trunnion bolts are tested for cracking and shearing based upon suspicion of bolt integrity. Otherwise, catastrophic failure is the first indication of a problem. Typically, testing is done by sounding which relies on the fact that a cracked or sheared bolt when tapped with a hammer will ring differently than a bolt in good operational condition. Once a cracked or sheared bolt is detected it is indicative that failure in others might soon occur and the complete ring of bolts is replaced so as to more durably secure the trunnion bearing post flange going forwards.

It will be understood that monitoring by sounding has one major drawback insofar as bolt failure is only detectable during a regular service outage. However, failure may occur immediately after such an outage with the potential for catastrophic or cascade failures of trunnion bolts before the next planned outage.

There exists a need for improved trunnion bolt monitoring preferably that can be used to detect bolt cracking when the preheater is in service. It is an object of the invention to provide a system to meet this need.

SUMMARY

According to an aspect of the present disclosure, a trunnion bolt monitoring system for an air preheater includes: a plurality of trunnion bolts, each having a close-ended longitudinal blind bore extending from an open end disposed at a head of the respective bolt into close proximity with at least a part of a bolt thread of the respective bolt; at least one pressure sensor; and a manifold in gas tight communication with the blind bores and the at least one pressure sensor.

In an embodiment, each blind bore is a stepped bore providing a female braze fitting at its open end.

Three pressure sensors are attached to the manifold and are in gas tight communication with the blind bores in an embodiment.

The manifold may provide a hoop-like bore communicating with bores of a plurality of down pipes, with each of the down pipe bores communicating with a corresponding one of the blind bores.

In an embodiment, each of a plurality of T-fittings is associated with a corresponding one of the trunnion bolts. A downwardly extending female connector of each T-fitting receives and is brazed to the upper end of the down pipe associated with the corresponding trunnion bolt, and horizontally extending female connectors of each T-fitting each receive and are brazed to one end of a respective stub pipe of the manifold.

In such a system, the pressure sensor or each pressure sensor could be a pressure actuated wireless electrical switch that is on when the manifold is pressurized.

A method of monitoring for failure of a plurality of trunnion bolts is also provided. The trunnion bolts form part of a trunnion bolt monitoring system that includes: a plurality of trunnion bolts, each having a close-ended longitudinal blind bore extending from an open end disposed at a head of the respective bolt into close proximity with at least a part of a bolt thread of the respective bolt; at least one pressure sensor; and a manifold in gas tight communication with the blind bores and the at least one pressure sensor. The manifold is pressurized with an inert gas and the pressure sensor is monitored for a drop in pressure. The pressure drop is taken to result from cracking of one or more of the bolts and to be indicative of potential bolt failure.

Another method is provided for monitoring for failure of trunnion bolts forming part of a similar trunnion bolt monitoring system that includes three pressure sensors, in which the manifold in gas tight communication with the pressure sensors. The manifold is pressurized with an inert gas and the three pressure sensors are each monitored for a drop in pressure, and a drop of pressure in at least two of the sensors is taken to result from cracking of one or more of the bolts indicative of potential bolt failure and a drop of pressure only one sensor is taken to result from sensor failure.

Each pressure sensor is an electrical switch actuating a remote alarm system in an embodiment.

DETAILED DESCRIPTION OF THE INVENTION

Figure 1:
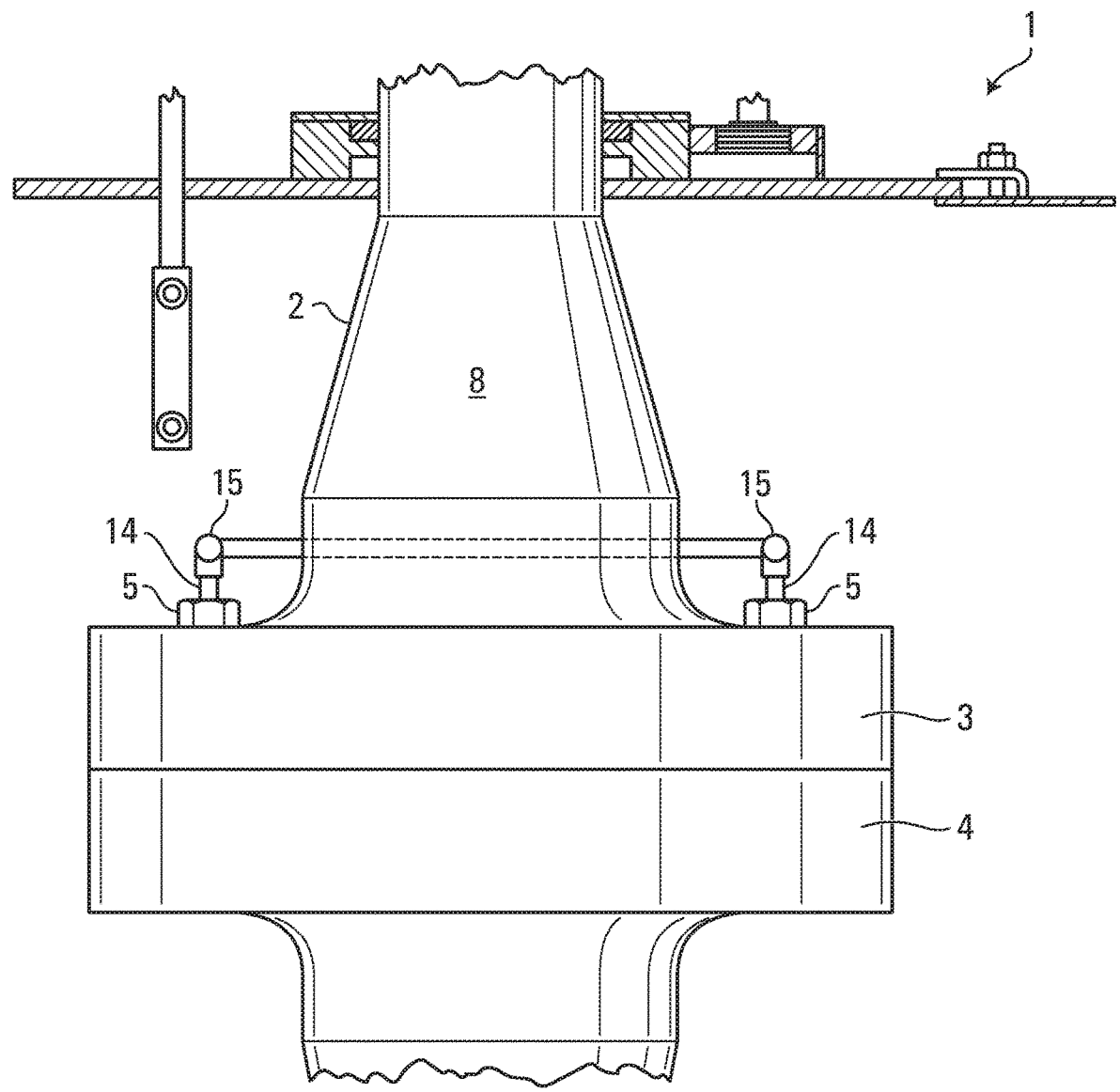
FIG. 1 is a partial cross sectional view of the rotor bearing section of an air preheater, through the axis of its trunnion, equipped with a trunnion bolt monitoring system in accordance with a preferred embodiment of the invention.
Figure 2:
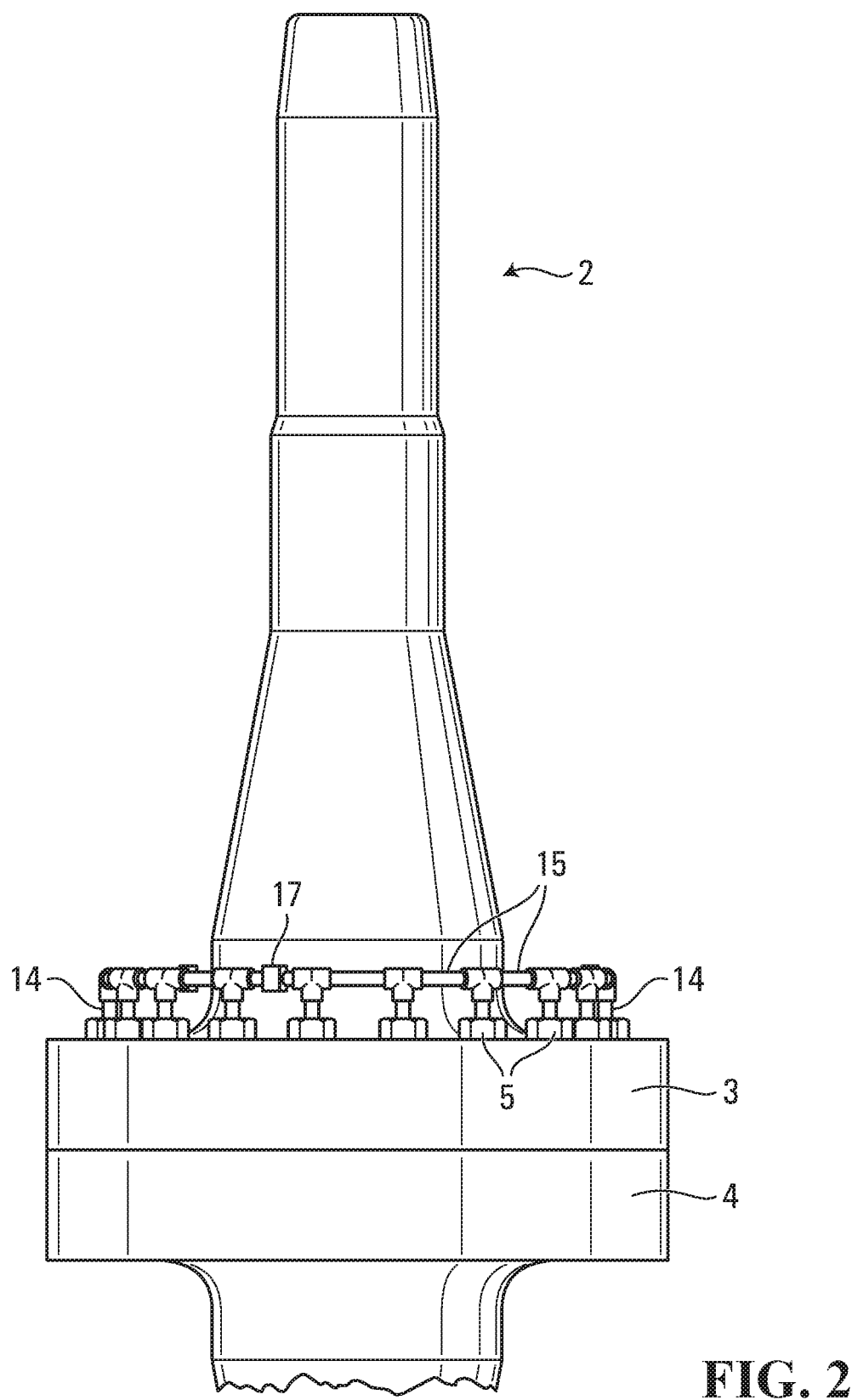
FIG. 2 is a side view of the trunnion and trunnion bolt monitoring system shown in FIG. 1.

As shown in FIG. 1, a rotary regenerative air preheater includes a rotor guide bearing assembly 1 fixedly mounted to support radially a rotor trunnion 2. The rotor trunnion 2 rests by means of an integral mounting flange 3 on a mounting flange of a rotor post 4 of the air preheater (not shown) and is securely attached thereto in known fashion by a ring of trunnion bolts 5. The trunnion 2 is maintained in position by a bearing assembly (not shown) and in operation rotates with the rotor post 4, maintaining the rotor's axis of rotation either vertical or horizontal, depending on the installation orientation of the overall air preheater.

Figure 4:
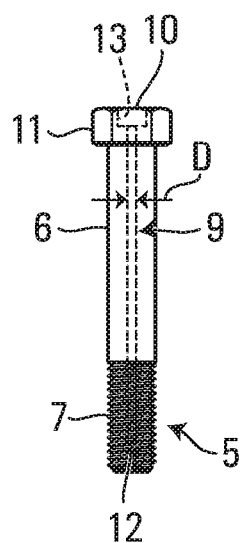
FIG. 4 is a side view of a trunnion bolt used with the preferred embodiment.

One such bolt 5 is illustrated in FIG. 4. The shanks 6 of bolts 5 extend through the mounting flange 3 and respective threaded portions 7 are received by complimentary threaded bolt holes in the mounting flange of the rotor post 4. During assembly the bolts 5 are tightened to prevent axial movement. However, these are large bolts and the threaded connection is not gas tight.

Although in use there is no discernable axial movement of the bolts 5 relative to the flanges 3 and 4, it will be appreciated that the trunnion 2 is subjected to substantial and variable eccentric loads which are transmitted as tensile loads and shear loads on the bolts 5. These loads occur by virtue of the extremely heavy preheater rotor assembly rotating at relatively slow speed and by virtue of dynamic forces resulting from the flow of combustion air and flue gas there through, as well as by slight deviations in rotor level caused by supporting structure shifts. During extended periods of operation fatigue failure of one or more of the threaded portions 7 is to be expected and this will likely first manifest itself as cracking due to tensile and/or shear failure. To detect any such cracks in service there is provided a trunnion bolt monitoring system in accordance with a preferred embodiment of the invention.

As can be seen in FIG. 4, each bolt 5 has an elongate blind bore 9 extending from an open end 10 at the top of the bolt head 11 and a closed end 12 disposed within the threaded portion 7. In another embodiment, the elongate blind bore may extend close to but not coaxial with the threaded portion. In said another embodiment as in the illustrated preferred embodiment the blind bore extends in close proximity to the threaded portion of the bolt.

The blind bore 9 is a portion of the monitoring system, from which such fatigue cracks may extend. In this preferred embodiment, the blind bore 9 is a stepped bore having adjacent its open end 10 a female braze fitting 13, with a lower portion of constant diameter $D=¼''$ drilled along the bolt axis. A respective short down pipe 14 (see FIG. 1) is received by a corresponding bolt head 11 and secured by brazing in its female fitting 13. The upper end of each down pipe 14 is mated to a downwardly extending female connector (not shown) of a corresponding T-fitting 15 and secured by brazing therein. Each T-fitting 15 has a top bar comprising two horizontally opposite female connectors (not shown) into which is mated and brazed a free end of an associated stub pipe 16 (see FIG. 3).

Figure 3:
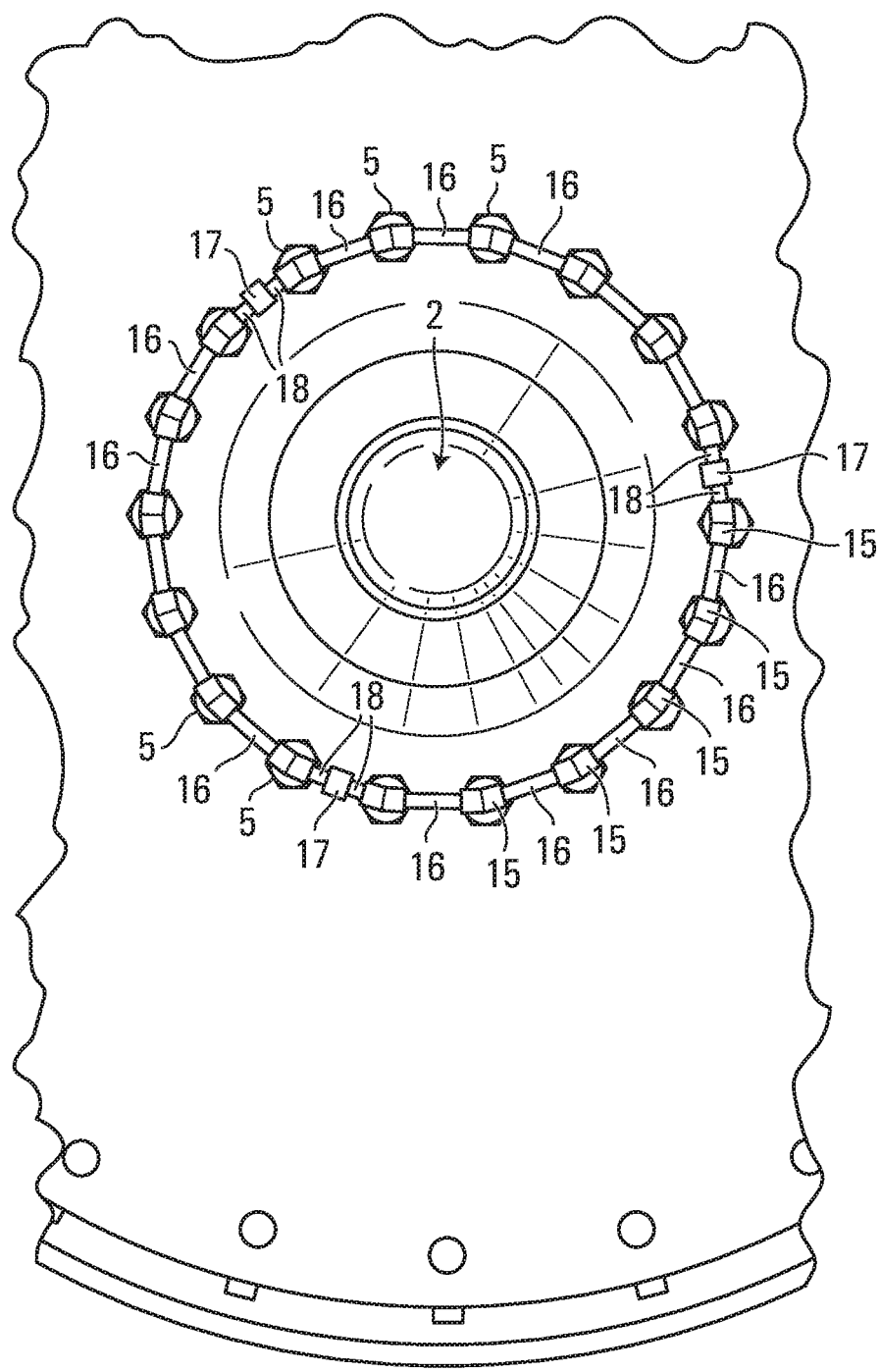
FIG. 3 is a top view of the trunnion and trunnion bolt monitoring system shown in FIG. 2.

As can clearly be seen in FIG. 3, each stub pipe 16 is typically connected to opposing female connectors of adjacent T-fittings 15. However, between three pairs of adjacent bolts 5 this is not the case. Instead, for each pair, a corresponding pressure sensor 17 is disposed intermediate the bolts 5 and attached in like fashion to the respective T-fittings 15 by shorter stub pipes 18. Alternatively, each pressure sensor 17 may have a male threaded connector that can be received gas tight in a threaded bore extending through the side wall of a corresponding stub pipe 16.

It will be understood that brazing as means of attachment is a relatively inexpensive and effective way of ensuring gas tight pipe joint connections variously between pipes 14, 16, 18, T-fittings 15, trunnion bolts 5 with blind bores 9 and pressure sensors 17 which collectively make up the locally installed components of the trunnion bolt monitoring system.

Typically, the installed components are mated and brazed together in situ. However, prefabrication may be utilized and some of the pipe joints may be brazed remotely in shop conditions or at a work bench. For example, the down pipes 14 may be preinstalled in their respective bolts.

Figure 5:
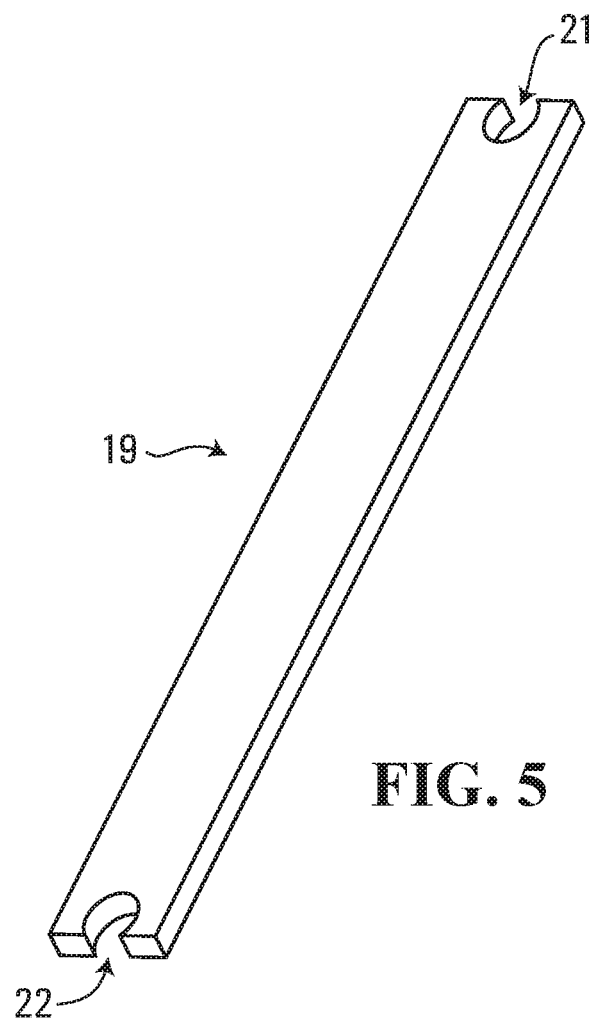
FIG. 5 is a perspective view of a locking bar for use in conjunction with the preferred embodiment of the invention.

To prevent bolts 5 working themselves loose in use a respective locking bar 19 having a modified 'flare wrench' configuration as illustrated in FIG. 5 is used in an embodiment between immediately adjacent pairs of bolts 5. Typically, such locking bars are flat stock bars in which end portions are tack welded to the top of bolt heads to prevent their loosening. However, to accommodate the down pipes 14, the locking bar 19 'flare wrench' is provided with a novel configuration that sits atop aside the bolts 5 and having cutouts 20, 21 at opposing ends which can extend around down pipes 14. The locking bars 19 are rigidly connected to bolts 5 by tack welding proximate the cutouts 20, 21, for example. Although to avoid bi-metallic corrosion and/or stress cracking of pipework the locking bars 19 are not rigidly connected to the down pipes 14, it will be appreciated that these pipes 14 facilitate location of a ring of locking bars 19 prior to tack welding to the bolts 5. In the embodiment of locking bar 19 illustrated the bar is fabricated by drilling suitably sized holes in flat steel stock and then trimming its ends to provide cutouts 21, 22 having circumferential edges describing a respective arc in excess of 180°. It will be understood that the arc permits accurate radial and axial location over adjacent down pipes 14. However, as required for location purposes only these cutouts 21, 22 may be suitably dimensioned so that when tack welded in place the edges do not contact or only lightly contact immediately adjacent down pipes 14, thereby ensuring there are no significant thermal or corrosive ill effects from their close proximity thereto.

Collectively the T-fittings 15, pipes 14, 16, 18 and actuator bodies of pressure sensor 17 form a gas tight manifold or pressure header with which the blind bores 9 communicate. To ensure the manifold is gas tight, a 24-hour leak-down test could be conducted during fabrication and leaks could then be repaired prior to re-testing. Subsequently, the manifold is pressurized with nitrogen. Nitrogen is introduced into the manifold by means of a gas connector (not shown) in an embodiment. It will be appreciated that any inert gas, Argon for example, could be used in place of Nitrogen. The use of gases that promote corrosion is to be avoided.

In an embodiment, the pressure sensors 17 are low voltage electrical switches which operatively provide an electrical reading indicating the binary states of pressurized and depressurized. The pressure sensors 17 are chosen to withstand harsh environments and may be connected by wiring (not shown) or by wireless transponders to a remote control panel, such as a Digital Control System (DCS) that is able to monitor readings of each of the respective three sensors 17 independently. Sensor failure might lead to a false depressurization reading, but it is unlikely that two sensors will fail simultaneously. Hence, a pressure drop in the manifold is monitored by the three pressure sensors 17 with a depressurization reading from a single sensor being indicative of sensor failing whilst depressurization readings from two or more sensors is indicative of pressure drop in the manifold. Control logic in the DCS discerns whether sensor failure or bolt failure has been detected. It will be understood that such control logic could be in a Programmable Logic Controller (PLC) of the air preheater itself located in a local control panel instead of remotely in a DCS. This is particularly recommended when wireless sensors are used with the wireless receiver thereof being located proximate the PLC into which it may be hardwired.

As previously explained, shearing or cracking of trunnion bolts was hitherto detected audibly by sounding with a hammer. With this invention it will be appreciated that any crack propagating from the sidewall of a blind bore 9 to the outside of the respective bolt 5 will lead to leakage of nitrogen through/from that bolt, in turn leading to depressurization of the manifold registerable by the pressure sensors 17. Thus, such cracking is identifiable when the air preheater is in service and not as hitherto only detectable by manual inspection during a planned outage. Typically, where depressurization of the manifold is identified it is indicative not only of cracking in one bolt 5 and predictive of it shearing completely, but also that the remaining bolts 5 are of a service age that similar fatigue failures are foreseeable. Consequently, either immediately or at the next scheduled service all the trunnion bolts 5 will be replaced. Naturally, if the only failure is of a single pressure sensor 17 then that sensor alone can be replaced during a short shutdown or otherwise at the next planned outage. Obviously, continued operation with one failed sensor remains possible as depressurization is measured from the readings of the two remaining operative sensors 17.

What has been described is merely illustrative of the application of principles of embodiments of the invention. Other arrangements and methods can be implemented by those skilled in the art without departing from the scope of the present invention.

The invention is not limited to use of a manifold or brazed gas tight connections as described for the preferred embodiment, although such does give desired gas tightness and thermal durability. Where other gas tight connections are used it will be appreciated that other, possibly non-metallic, materials for manifold components could be used and joints may be made by soldering, plastics welding, gluing and/or by screw connectors or other fasteners as appropriate. Similarly the manifold could, instead of being pressurized, be subject to a vacuum with the manifold then being monitored for a pressure rise indicative of leakage.

What is claimed is:
1. A trunnion bolt monitoring system for an air preheater, the trunnion bolt monitoring system comprising:
   a plurality of trunnion bolts, each having a close-ended longitudinal blind bore extending from an open end disposed at a head of the respective bolt into close proximity with at least a part of a bolt thread of the respective bolt;
   at least three pressure sensors;
   a manifold pressurized with a static inert gas, the manifold in gas tight direct communication with the blind bores and the at least three pressure sensors; and
   the at least three pressure sensors are attached to the manifold and are in gas tight direct communication with the blind bores, wherein;
   (a) a drop of pressure detected in at least two of the at least three pressure sensors is indicative of cracking of one or more of the bolts, thereby indicating potential bolt failure; and
   (b) a drop of pressure of only one of the at least three pressure sensors is indicative of sensor failure.

2. A system in accordance with claim 1, in which each blind bore is a stepped bore providing a female braze fitting at its open end.

3. A system in accordance with claim 1, in which the manifold communicates with bores of a plurality of down pipes, each of the down pipe bores communicating with a corresponding one of the blind bores.

4. A system in accordance with claim 3, comprising a plurality of T-fittings each associated with a corresponding one of the trunnion bolts, in which a downwardly extending female connector of each T-fitting receives and is brazed to the upper end of the down pipe associated with the corresponding trunnion bolt, and in which horizontally extending female connectors of each T-fitting each receive and are brazed to one end of a respective stub pipe of the manifold.

5. A system in accordance with claim 1, in which each pressure sensor is a pressure actuated wireless electrical switch that is on when the manifold is pressurized.

6. A method of monitoring for failure of a plurality of trunnion bolts forming part of a trunnion bolt monitoring system, the method comprising:
   providing a trunnion bolt monitoring system comprising:
      a plurality of trunnion bolts, each having a close-ended longitudinal blind bore extending from an open end disposed at a head of the respective bolt into close proximity with at least a part of a bolt thread of the respective bolt;
      at least three pressure sensors; and
      a manifold in gas tight direct communication with the blind bores and the at least three pressure sensors;
   the manifold with a static inert gas, and monitoring each of the at least three pressure sensors for a drop in pressure, wherein;
   (a) detecting a drop of pressure in at least two of the at least three pressure sensors is indicative of cracking of one or more of the bolts, thereby indicating potential bolt failure; and
   (b) detecting a drop of pressure of only one of the at least three pressure sensors is indicative of sensor failure.

7. A method in accordance with claim 6, in which each pressure sensor is an electrical switch actuating a remote alarm system.

* * * * *

UNITED STATES PATENT AND TRADEMARK OFFICE
CERTIFICATE OF CORRECTION

PATENT NO. : 10,866,154 B2
APPLICATION NO. : 16/464980
DATED : December 15, 2020
INVENTOR(S) : David W. Bintz and Travis N. Tozer It is certified that error appears in the above-identified patent and that said Letters Patent is hereby corrected as shown below:

In the Claims

Claim 6
Column 6, Line 52: Before "the manifold", please insert --pressurizing--.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*